3,398,833
SUPPORT PLATES FOR REVERSE OSMOSIS
DESALINATION APPARATUS
Murray Marks, Los Angeles, and Joseph A. Ferrara, Glendale, Calif., assignors to Aerojet-General Corporation, El Monte, Calif., a corporation of Ohio
Filed Sept. 9, 1966, Ser. No. 578,266
7 Claims. (Cl. 210—321)

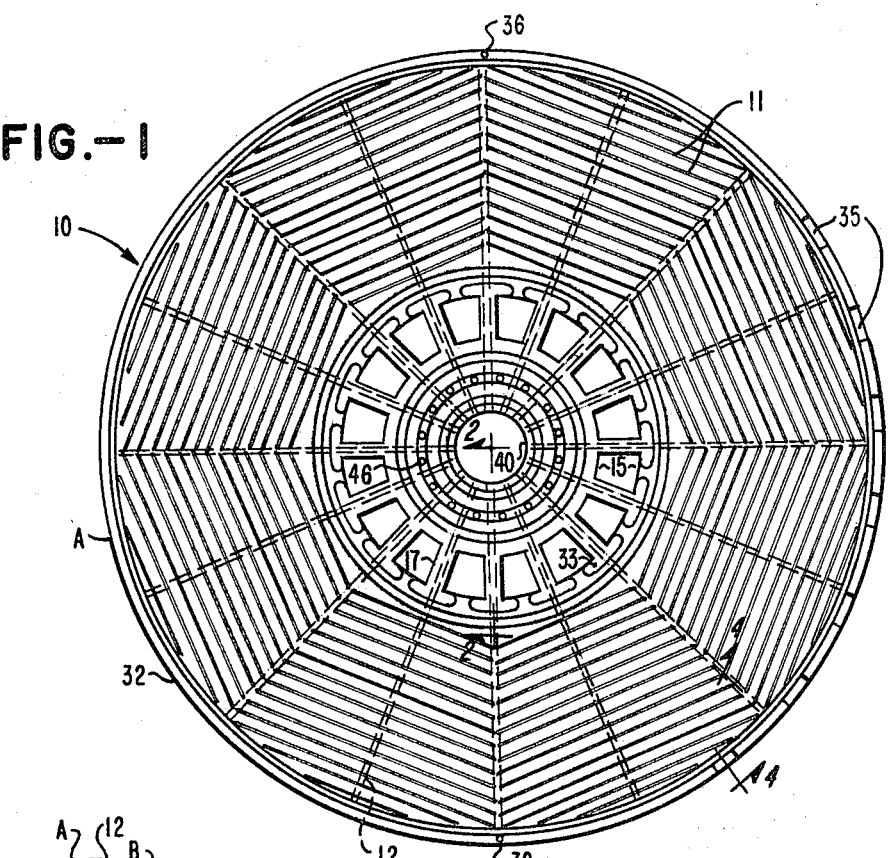
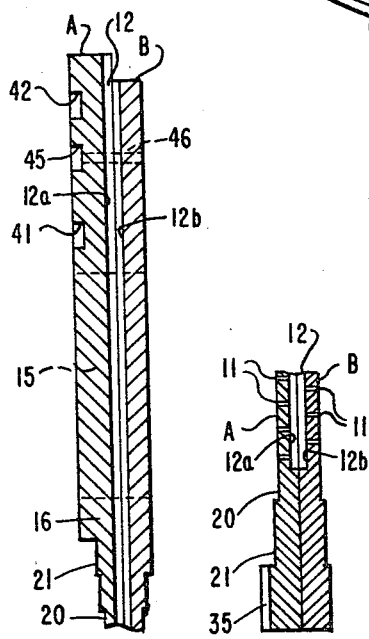
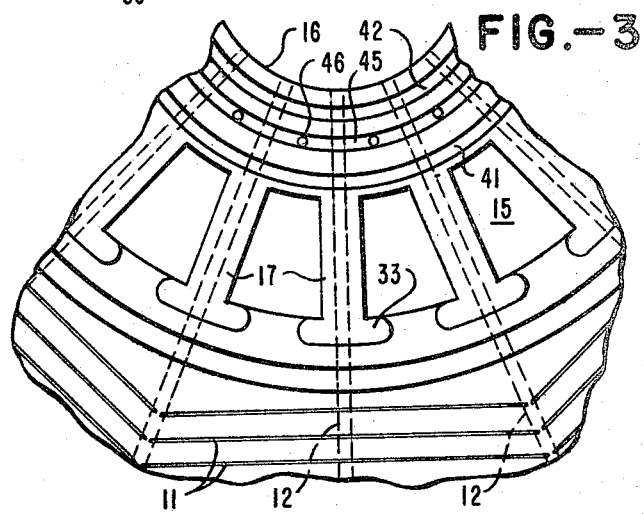
FIG.-1
FIG.-2  FIG.-4  FIG.-3
INVENTORS
MURRAY MARKS
JOSEPH A. FERRARA
ATTORNEYS

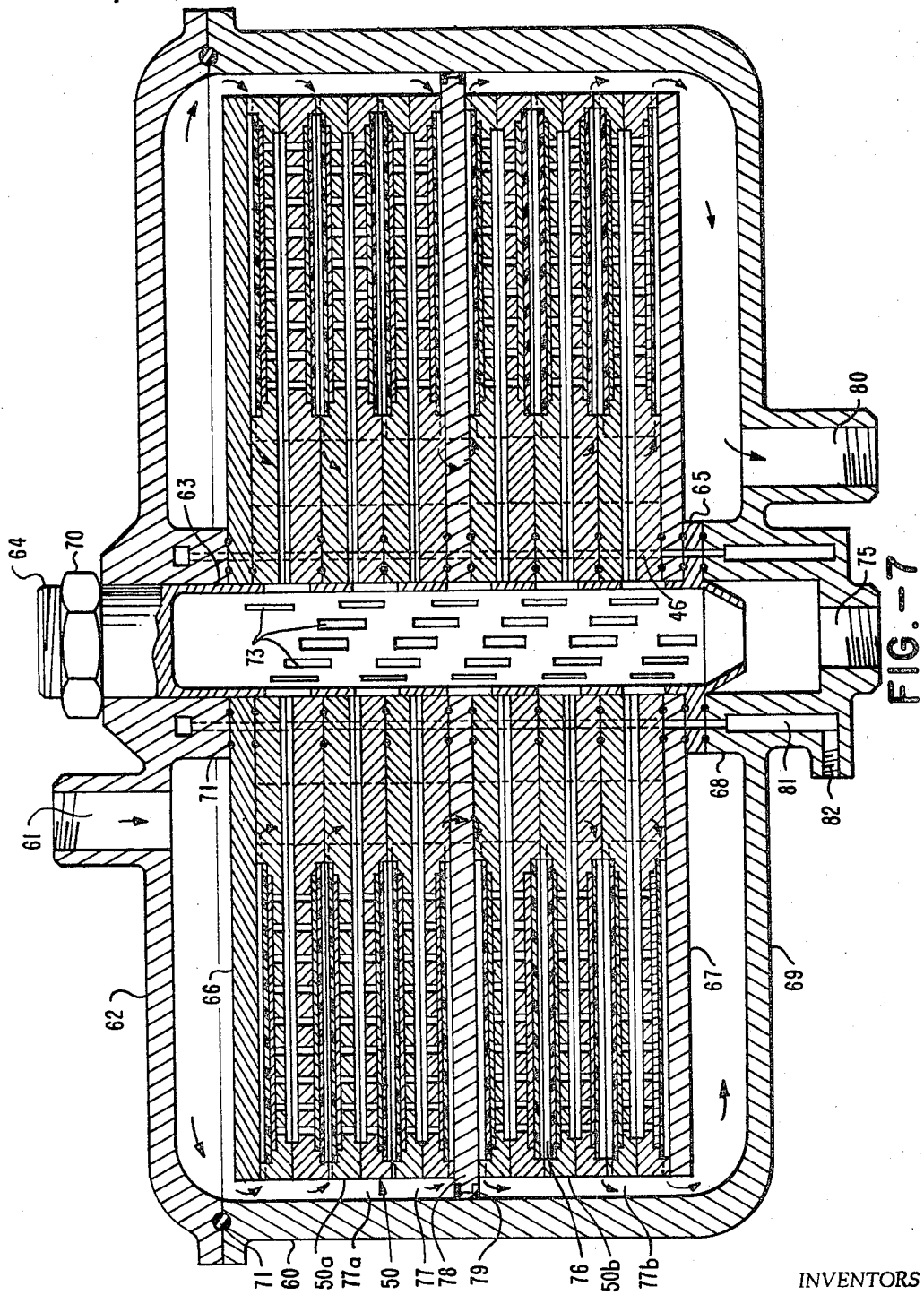

ABSTRACT OF THE DISCLOSURE

A reverse osmosis desalination device comprising a stack of plates, each plate comprising, two annular disc segments, each segment supporting a membrane and having lateral slots communicating with said membrane and with radial passageways which lead to a desalinated water header, alternating segments having projecting portions to space said membranes apart.

---

This invention relates to the desalination of saline water including brackish water and sea water having salts dissolved therein, and more particularly to a support plate for reverse osmosis membrane assemblies in a desalination device, wherein the desalination device comprises a plurality of desalination cells with the reverse osmosis membranes of each cell being disposed on opposite sides of the support plate. The support plate has fluid conducting passageways formed therein for directing liquid passed through the membranes from which dissolved salts have been removed to a product discharge outlet so as to effectively separate the product liquid from the saline water being processed through the desalination device.

The utilization of saline water, such as sea water or brackish water, as a source from which fresh water can be obtained has long been considered as a possible solution to the problem of shortages in fresh water supplies. One technique by which dissolved salts can be removed from saline water to produce fresh water suitable for drinking and other potable uses involves the principle of reverse osmosis. Reverse osmosis requires the use of a semi-permeable membrane having particular permeability and surface properties so as to selectively transmit fresh water therethrough while rejecting dissolved salts in the saline water to which the membrane is exposed. The saline water is forced against the membrane under pressure with the permeability of the membrane being such that it passes fresh water therethrough at a much greater rate than the dissolved salts in the saline water.

One type of desalination cell operating on the principle of reverse osmosis is disclosed in copending U.S. application, Ser. No. 554,773 filed June 2, 1966, now abandoned, in which reverse osmosis membranes are provided on opposite sides surfaces of an intermediate porous support plate. The porous support plate is adapted to collect fresh water passed through the membranes, with the fresh water subsequently percolating through the porous support plate to a fresh water outlet conduit. The porous support plate in such desalination cells is normally made of sintered metal, such as stainless steel which is relatively expensive. Moreover, such support plates of porous sintered metal have a tendency to introduce objectionable pressure losses into a desalination device employing desalination cells of the character described which adversely affects the efficiency of the desalination device in producing fresh water from saline water.

In a reverse osmosis membrane assembly, some provision must be made for adequately supporting the semi-permeable reverse osmosis membranes which are exposed to saline water under a pressure higher than the osmotic pressure over a period of time, since the material of the membranes themselves cannot withstand such pressures without rupturing or tearing. In addition, provision must be made for collecting fresh water passed through the membranes of each desalination cell and directing the fresh water to a receptacle or conduit for discharge from the desalination device, while preventing co-mingling of such fresh water with the saline liquid being processed through the desalination device.

It is also important from an efficiency standpoint to fully expose the surface areas of all of the reverse osmosis membranes in a desalination device to the saline water being processed therethrough so as to utilize the maximum amount of membrane surface area in extracting fresh water from the saline water.

It is therefore an object of the present invention to provide in a device for desalinating liquid by reverse osmosis wherein a plurality of desalination cells employing reverse osmosis membrane assemblies are utilized, a novel membrane support member in the form of an intermediate plate supporting reverse osmosis membranes on opposite sides thereof, wherein the support plate is constructed so as to provide fluid passageways through which fresh water passed through the membranes is directed to a fresh water discharge means for removal from the desalination device.

It is another object of this invention to provide a novel plate member having a plurality of internal circumferentially spaced radially extending channels intersecting with respective laterally disposed slots formed in the opposite side surfaces thereof to define a network of fluid-conducting passageways in the plate member for facilitating the handling of liquids, the plate member being especially applicable for use as a support plate for reverse osmosis membrane assemblies disposed on opposite sides thereof to comprise a desalination cell, wherein the fluid-conducting passageways formed in the plate member are adapted to transmit fresh water passed through the membranes on the opposite sides thereof to a suitable fresh water outlet for removal of the fresh water from a desalination device in which the desalination cell is disposed.

Certain objects of the invention having been stated, other objects will become apparent as the description proceeds, when taken in connection with the accompanying drawings, in which:

FIGURE 1 is an elevational view looking at one side of the novel plate for facilitating the handling of liquids, as constructed in accordance with the present invention;

FIGURE 2 is an enlarged fragmentary cross sectional view of the plate taken along the line 2—2 in FIGURE 1;

FIGURE 3 is an enlarged fragmentary elevational view of an inner portion of the plate of FIGURE 1;

FIGURE 4 is an enlarged fragmentary cross sectional view substantially along the line 4—4 in FIGURE 1;

Figure 5:
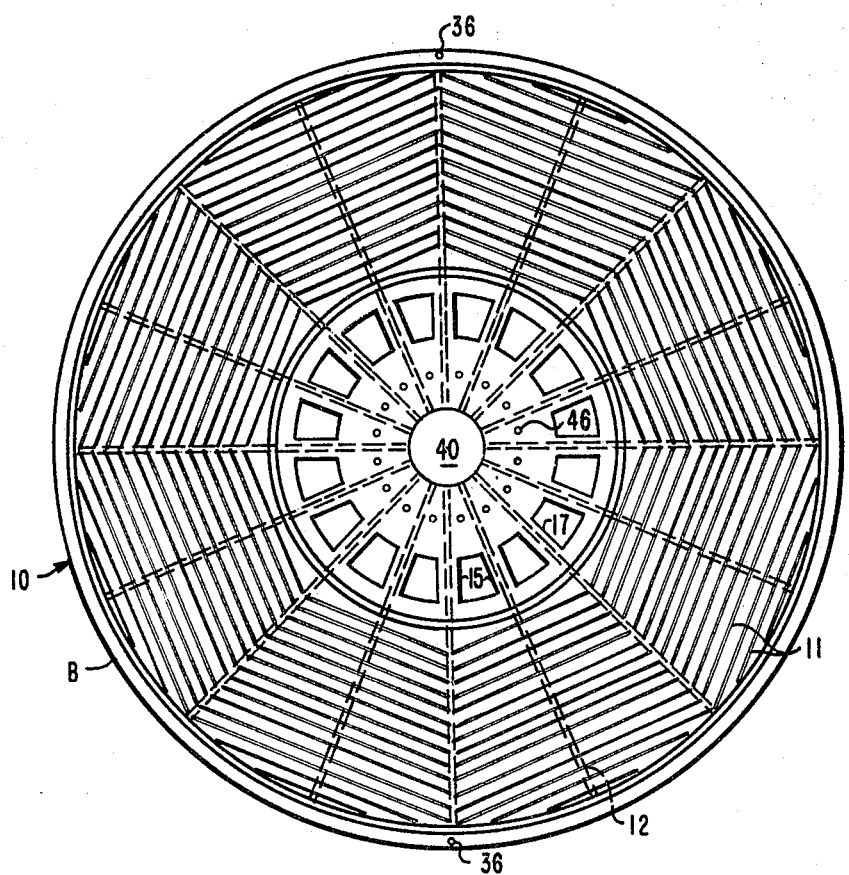
FIGURE 5 is an elevational view looking at the opposite side surface of the plate as shown in FIGURE 1.
Figure 6:
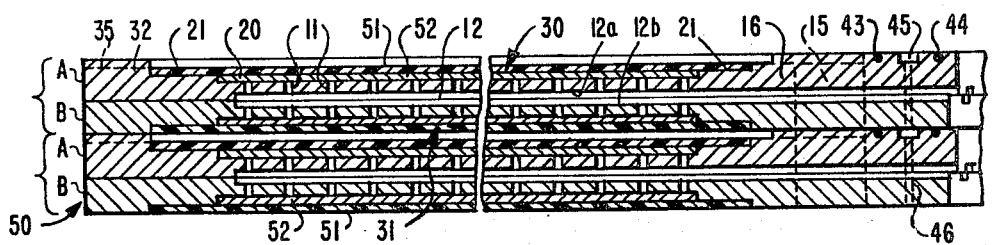

FIGURE 6 is an enlarged cross sectional view, partially broken away, and showing a pair of adjacent desalination cells, each of which includes an intermediate plate supporting reverse osmosis membrane assemblies on its opposite sides in accordance with the present invention; and FIGURE 7 is a longitudinal sectional view of a desalination device showing the plate of FIGURES 1–6, inclusive, as a support plate for reverse osmosis membrane assemblies in each of a plurality of desalination cells included in the desalination device.

Referring more specifically to the drawings, a plate to facilitate fluid handling as constructed in accordance with the present invention is illustrated in FIGURES 1–6, inclusive, the plate being particularly applicable as a support plate for reverse osmosis membrane assemblies in a desalination cell to be incorporated in a device for desalinating liquids employing the principle of reverse osmosis. The plate, designated broadly by reference numeral 10, is segmental in character comprising a pair of half segments in the form of circular discs A and B which are bonded together to form the plate 10. Each of the circular disc segments A and B comprising the composite segmental plate 10 includes an inwardly offset central portion provided with a plurality of radially spaced laterally extending slots 11 extending therethrough and arranged across a substantial portion of the side surface area of the respective disc segment. The slots 11 are disposed in spaced groups of parallel slots extending across an arcuate portion of the circular disc, there being eight such arcuate portions of the disc as illustrated in FIGURES 1 and 5 respectively and eight groups of radially spaced parallel laterally extending slots 11 formed therein so as to provide composite interrupted slots of polygonal shape, in this instance octagonal, extending 360° about the side surface of the circular disc segment A or B. It will be understood, however, that the slots 11 may be arranged in a pattern other than as shown within the spirit of this invention. For example, the slots 11 in each group may be arcuate in shape so as to define respective composite interrupted slots which are circular.

The composite segmental plate 10 is further provided with a plurality of internal radially extending flow channels 12 which are arranged in circumferentially spaced relationship so as to provide communication between each of the slots 11 through the inset central portions of the disc segments A and B with the inner periphery of the composite segmental plate 10. To this end, a plurality of circumferentially spaced radial grooves are formed in the proximally related surfaces of the disc segments A and B, the plurality of radial grooves 12a in the disc segment A and 12b in the disc segment B extending from the inner peripheries thereof radially outwardly through the respective inset central portions so as to intersect with the plurality of laterally extending slots 11 of the respective disc segments to provide communication therebetween. Thus, the radial grooves 12a and 12b in the disc segments A and B are arranged in aligned opposed relation, thereby cooperating to define the plurality of internal radially extending flow channels 12 in the composite segmental plate 10. In this connection, it will be observed in FIGURES 2 and 6 that the inner periphery of the composite segmental plate 10 is stepped in that the inner diameter of the disc segment A is smaller than the inner diameter of the disc segment B so that the disc segment A extends radially inwardly of the disc segment B with the plurality of radial grooves 12a therein therefore extending radially inwardly of the corresponding radial grooves 12b in the disc segment B.

The composite segmental plate 10 further includes a plurality of apertures 15 therethrough, the apertures 15 being individually disposed radially inwardly of the slots 11 in the respective disc segments A and B in a hub portion 16 of the plate 10. The hub portion 16 includes a plurality of radial spokes 17, the spokes 17 being respectively disposed between adjacent apertures 15. The plurality of internal radial flow channels 12 formed in the plate 10 by the opposed radial groves 12a and 12b in the disc segments A and B respectively extend through individual radial spokes 17 of the hub portion 16 of the segmental composite plate 10. It will be understood that the apertures 15 in the plate 10 are defined by providing each of the disc segments A and B with a plurality of apertures therethrough, the apertures in disc segment A being aligned with corresponding apertures in disc segment B to define the apertures 15 which are individually disposed radially inwardly of the slots 11 in the respective disc segments A and B. The radial spokes 17 of the segmental composite plate 10 are similarly formed from aligned portions of the disc segments A and B so as to extend between adjacent apertures 15.

The inwardly offset central portion of each disc segment A and B in which the slots 11 are respectively provided comprises an annular flat central surface portion 20. The annular flat central surface portions 20 of the outwardly disposed side surfaces of the composite plate 10 are axially inset from the remaining portions of such side surfaces. Each of the side surfaces of the composite plate 10 defined by the respective outwardly disposed side surfaces of each disc segment A and B also includes radially inner and outer annular flat ledges 21. These radially inner and outer ledges 21 respectively adjoin the radially inner and outer margins of the annular flat central surface portion 20 corresponding thereto and are of increased axial extent with respect thereto, but of lesser axial extent than the remaining portions of the outwardly disposed side surface of the disc segment on which they are formed. The annular flat central surface portion 20 and the inner and outer ledges 21 provide respective seats for receiving layer components of reverse osmosis membrane assemblies 30 and 31 which are to be respectively positioned on the disc segments A and B of the segmental composite plate 10 so as to cover the slots 11 in the inset central portions thereof.

It will be noted that the section of the hub portion 16 on the disc segment A is raised as is the outer peripheral portion of the disc segment A with respect to the inner and outer ledges 21 so as to project axially beyond the reverse osmosis membrane assembly 30 affixed to the disc segment A. The outer peripheral portion of the disc segment A defines a peripheral rim 32, and the raised section of the hub portion 16 on the disc segment A includes as a part thereof a plurality of arcuate bosses 33 (FIGURES 1 and 3) which are arranged in circumferentially spaced relationship, each boss 33 being integral with a corresponding section of a radial spoke 17 on the disc segment A and being positioned at the radially outer end thereof. Each of the bosses 33 extends beyond either side of the section of the radial spoke 17 to which it corresponds to provide a relatively wide expanse for the boss 33. The outer peripheral rim 32 and the raised section of the hub portion 16 including the plurality of arcuate bosses 33 on the disc segment A serve as spacing means between adjacent desalination cells when disposed in a desalination device in stacked relationship as will be hereinafter described.

The raised peripheral rim 32 of the disc segment A is interrupted at a plurality of positions about the circumference of the disc segment A by notches 35 (FIGURES 1 and 4) to provide a plurality of radial fluid flow passages in the segmental composite plate 10 through the raised peripheral rim 32 of the disc segment A thereof. Preferably, both disc segments A and B of the segmental composite plate 10 also include alignment holes 36 therethrough, the alignment holes 36 of adjacent segmental composite plates 10 being adapted to be brought into registration for receiving an elongated wire therethrough to retain a series of desalination cells including respective plates 10 as components thereof in a unitary assembly. As shown, two alignment holes 36 are provided in the respective outer peripheral portions of the disc segments A and B in diametrically opposite relationship to each other.

The composite segmental plate 10 is further provided with a means to seal off the central opening 40 thereof from the plurality of apertures 15 disposed radially outwardly with respect to the central opening 40, it being understood that such sealing means is employed in providing a sealing relationship between the composite segmental plates 10 of adjacent desalination cells. To this end, the disc segment A of the composite segmental plate 10 is provided with a pair of radially spaced annular grooves 41, 42 in the raised section of the hub portion 16 thereof for reception of O-ring seals 43, 44, respectively. The O-rings 43 and 44 may be made of any suitable resilient elastomeric material which is resistant to the corrosive effect of the fluid with which the composite segmental plate 10 is to come into contact. It will be understood that the O-rings 43 and 44 protrude outwardly with respect to the grooves 41 and 42 in which they are received so as to sealingly engage the adjoining surface of a hub portion 16 on the disc segment B of an adjacent plate 10 when the plates 10 are arranged in stacked relationship as components of adjacent desalination cells.

Means are provided for detecting fluid leakage past either of the O-rings 43 and 44 to further guard against commingling of the fresh water extracted by the individual desalination cells and the saline water being processed through the desalination device. The leakage detection means comprises a third annular groove 45 formed in the raised sections of the hub portion 16 on the disc segment A, the third groove 45 being disposed intermediate the grooves 41 and 42 in which the O-rings 43 and 44 are received. The intermediate groove 45 is connected to a plurality of axial ports 46 extending through the disc segments A and B, the axial ports 46 being respectively disposed radially inwardly of the apertures 15 in the hub portion 16 between adjacent radial flow channels 12 of the composite segmental plate 10. It will be understood that fluid leakage radially inwardly of O-ring seal 43 and radially outwardly of O-ring seal 44 will be collected in the intermediate groove 45 and subsequently transmitted through the axial ports 46 to a sump or receptacle, thereby giving an indication of seal failure.

In accordance with the present invention, the fluid-handling composite segmental plate 10 serves as a support plate between reverse osmosis membrane assemblies 30, 31 so as to form a desalination cell 50 therewith. Thus, each composite segmental plate 10 carries a pair of reverse osmosis membrane assemblies 30, 31 on its opposite sides in the manner described, wherein the reverse osmosis membrane assemblies 30, 31 respectively include a membrane or film 51 of semi-permeable material capable of rejecting the dissolved salts in sea water or brackish water while permitting the passage of fresh water therethrough, such as a cellulose acetate film. Each of the reverse osmosis membrane assemblies 30, 31 may further include a porous substrate sheet material in the form of a filter paper layer 52 backing up the reverse osmosis membrane 51 and adapted to be affixed to the respective opposite sides of the support plate 10. In this instance, the filter paper layer 52 is seated on the annular flat central surface portion 20 and the membrane 51 is seated on the inner and outer ledges 21 of each side of the plate 10 so as to cover the slots 11 respectively formed in the disc segments A and B comprising the composite segmental plate 10.

The filter paper layer 52 enables the membrane 51 of cellulose acetate film to withstand the required pressure differential between the saline water and the fresh water on opposite sides of the membrane 51 which must be present in order to extract fresh water from the saline water through the membrane 51 by reverse osmosis. The physical characteristics of a cellulose acetate film comprising the reverse osmosis membrane 51 are such that, when subjected to pressure the cellulose acetate film is susceptible to perforation thereof by extrusion effects which may result in irreparable damage to the membrane by allowing direct passage of saline water through the perforations formed therein. The filter paper back-up layer 52 has sufficient strength to enable the cellulose acetate film 51 to support the pressure differential required for reverse osmosis without the formation of perforations in the cellulose acetate film 51 and is sufficiently porous to allow passage of fresh water from the membrane 51 through the slots 11 to the radial flow channels 12 in the support plate 10 without excessive pressure loss. The cellulose acetate membrane 51 is backed up by the layer of filter paper 52 permits fresh water to pass therethrough, while rejecting dissolved salts without any adverse effect upon its performance following exposure to saline water over a period of time.

The respective reverse osmosis membrane assemblies 30 and 31 are suitably secured to the opposite sides of the support plate 10, such as by applying adhesive material to the radially outwardly and inwardly extending portions of the membranes 51, 51 beyond the filter paper layers 52, 52 to adhere to membranes 51, 51 to the respective ledges 21, 21 corresponding thereto. Upon subjecting a desalination cell 50 of the type described to saline water by exposing the membranes 51, 51 of the cell 50 thereto, fresh water is passed by the membranes 51, 51 into the slots 11 through the filter paper layers 52, 52, and the fresh water is thereafter directed into the plurality of radial flow channels 12, being subsequently discharged from the cell 50 into the central aperture 40 of the plate 10 thereof.

Referring now to FIGURE 7, there is illustrated a desalination device which includes a plurality of desalination cells 50, wherein each cell 50 has a support plate 10 as a component thereof, the support plate 10 carrying reverse osmosis membrane assemblies 30 and 31 on its opposite side surfaces. As shown, the desalination device comprises a generally cylindrical housing 60 in which the plurality of desalination cells 50 are received in stacked relationship so as to be exposed to saline water which may be introduced into the housing 60 from one end thereof through an inlet opening 61 provided in an end closure member 62 for the housing 60. A fresh water discharge conduit 63 is received in the housing 60, being disposed centrally thereof and extending axially. The conduit 63 includes a closed threaded forward end portion 64 which is received through a central opening formed in the end closure member 62 so as to extend outwardly of the housing 60. The conduit 63 further includes an annular radial collar 65 on its opposite end portion. A pair of internal end plates 66 and 67 are mounted within the housing 60 between which the plurality of desalination cells 50 are disposed in stacked clamped relationship, as will be presently described. The internal end plates 66 and 67 are respectively provided with central openings therethrough for receiving the conduit 63. The annular collar 65 on the conduit 63 is disposed axially outwardly with respect to the internal end plate 67 so as to be located between the internal end plate 67 and a central axial boss 68 provided on the rear end closure 69 of the housing 60, the annular collar 65 being in abutting relation to the end plate 67 and the boss 68. The conduit 63 is secured in place by a lock nut 70 which is received about the threaded forward end portion 64 thereof and is adapted to be tightened for providing sufficient clamping pressure to the plurality of desalination cells 50 from the internal end plates 66, 67. It will be understood that a suitable seal 71 is provided between the end closure member 62 and the housing 60.

The conduit 63 is provided with a plurality of fluid-receiving orifices therethrough which take the form of respective series of circumferentially spaced axially extending slots 73, wherein each series of such slots 73 is arranged with the individual slots thereof disposed in staggered relationship so as to extend across the central apertures 40 of adjacent desalination cells 50. Thus, it will be understood that fresh water extracted by the individual cells 50 from the saline water being processed through the housing 60 will be transmitted through the radial flow channels 12 in the support plates 10 to the central apertures 40 thereof from where the fresh water enters through the slots 73 into the conduit 63 and is subsequently withdrawn through a fresh water discharge outlet 75 provided in the rear end closure 69 of the housing 60.

When the desalination cells 50 are disposed in the housing 60 in stacked relationship, it will be appreciated that the outer peripheral rim 32 and the inner raised section of the hub portion 16 including the bosses 33 on the disc segment A of each plate 10 serve as spacer elements to axially space proximal reverse osmosis membrane assemblies of adjacent cells 50 apart for providing an annular space 76 between adjacent cells 50 through which the saline water being processed by the desalination device flows so as to expose the proximal reverse osmosis membrane assemblies of adjacent cells 50 to the saline water for extracting fresh water therefrom in the manner previously described. In this connection, the radial notches 35 in the outer peripheral rim 32 of the disc segment A in each support plate 10 define connecting radial passages between each of the annular spaces 76 and an annular axially elongated chamber or space 77 existing between the outer peripheries of the respective cells 50 and the housing 60. Similarly, the spaces between adjacent bosses 33 on the disc segment A of each plate 10 define connecting radial passages between each of the annular spaces 76 and the plurality of apertures 15 in the hub portions 16 of the respective support plates 10. Such connecting radial passages are shown in dotted lines in FIGURE 7. The plurality of apertures 15 formed in each of the support plates 10 are aligned to define a plurality of axially extending passageways through the stacked desalination cells 50. The saline water being processed by the desalination device is adapted to flow through the axially extending passageways defined by the aligned plurality of apertures 15.

In order to promote proper passage of the saline liquid through the device, the desalination cells 50 are separated into two or more sections or groups, there being two such groups of cells 50a and 50b illustrated in FIGURE 7. Between each group of desalination cells 50a and 50b, a partition plate 78 is provided, the partition plate 78 including a plurality of apertures in the radially inner portion thereof corresponding to the apertures 15 in the support plates 10 of the individual cells 50 and in registration therewith and being also provided with a central aperture for receiving the conduit 63 therethrough. The partition plate 78 is sealed to the housing 60 by a suitable sealing ring of elastomeric corrosion-resistant material. As shown, the outer periphery of the partition plate 78 extends radially outwardly of the cells 50 and the internal end plates 66, 67, the partition plate 78 carrying a sealing ring 79 which engages the housing 60 so as to provide an intermediate closure for the axially elongated annular chamber 77 existing between the outer peripheries of the cells 50 and the housing 60, thereby dividing the chamber 77 into two chamber sections 77a and 77b respectively corresponding to the two groups 50a and 50b of cells. This causes the saline liquid to be thoroughly exposed to successive cells 50 in each of the groups 50a and 50b of cells 50. Thus, saline liquid upon entering the housing 60 through the inlet opening 61 is directed radially outwardly about the outer periphery of the internal end plate 66 into the elongated annular chamber section 77a. From the elongated chamber section 77a, the saline liquid flows radially inwardly through respective radial passages defined by the notches 35 in the disc segments A of the support plates 10 included as components of the cells 50 in the first group of desalination cells 50a. The saline liquid is then directed radially inwardly through the annular spaces 76 between proximal reverse osmosis membrane assemblies of adjacent cells 50 in the first group of desalination cells 50a with fresh water being passed through the membranes 51, 51 to the respective support plates 10, 10 in the manner previously described.

Upon flowing radially inwardly to the inner boundaries of the annular spaces 76 between the proximal reverse osmosis membrane assemblies of adjacent cells 50 in the first group of desalination cells 50a, the saline liquid then passes through respective radial passages defined by the spaces between adjacent bosses 33 on the disc segment A of each plate 10 so as to be directed into the plurality of apertures 15 formed in the support plate 10 of each cell 50 in group 50a. Thereafter, the saline liquid flows through the plurality of axially extending passageways defined by the aligned apertures 15 in the support plates 10 of the cells 50 in both groups of cells 50a, 50b. In the latter respect, the saline liquid passes through the apertures in the partition plate 78 which register with the apertures 15 so as to enter the portion of the housing 60 containing the group of cells 50b. The saline liquid then flows radially outwardly from the plurality of apertures 15 formed in each of the support plates 10 included as components of the cells 50 in groups 50b through connecting radial passages and into the annular spaces 76 between the proximal reverse osmosis membrane assemblies of adjacent cells 50 in the second group of desalination cells 50b. Thus, the saline liquid is directed across the membranes 51 of the cells 50 included in group 50b with fresh water being passed through such membranes 51 to their respective support plates 10 in the manner previously described. The saline liquid continues to flow radially outwardly, subsequently entering the axially elongated annular chamber section 77b through the radial passages connecting the chamber section 77b with the annular spaces 76 provided between adjacent cells 50 in the group 50b. From the chamber section 77b, the saline liquid flows past the outer periphery of the internal end plate 67 and is discharged from the housing 60 as a saline concentrate liquid through a suitable discharge outlet 80 provided in the rear end closure 69 of the housing 60.

As a practical matter, the normal direction of flow of saline liquid through the housing alternates between a radially inwardly directed flow and a radially outwardly directed flow as the saline liquid passes through successive groups of cells, it being understood that multiple groups of cells may be provided in the housing. The directional flow of the saline liquid in the illustrated embodiment shown in FIGURE 7 is indicated by the arrows.

Although not shown, the flow of saline liquid through the desalination device may be further controlled by interposing a baffle plate of the type disclosed in copending U.S. patent application Ser. No. 577,907 filed Sept. 8, 1966, now abandoned, between adjacent cells 50 in the respective annular spaces 76 so as to direct the flow of saline liquid between adjacent cells 50 in spiral paths.

Turning now to the leakage detection means incorporated in the composite segmental support plate 10 of each cell 50, the plurality of axial ports 46 of respective support plates 10 are aligned in registration with corresponding axial ports 46 in successive cells 50 throughout the complete assembly of cells, there being a similar series of axial ports provided in the partition plate 78 along with corresponding O-ring seals disposed radially inwardly and radially outwardly thereof, as will be understood. Thus, the respective leakage collection grooves 45 and the plurality of axial ports 46 in each of the support plates 10 cooperate to define a plurality of axially extending fluid leakage passageways which terminate at their rear ends in an annular leakage collection chamber 81. The annular leakage collection chamber 81 may be suitably formed in the rear end closure of the housing 60 and may have a tap hole 82 associated therewith for removing leakage fluid by a suitable pump (not shown). In the latter connection, the O-ring seals 43, 44 carried by the disc segment A of the support plate 10 for each cell 50 will normally prevent commingling of the fresh water being transmitted through the support plate 10 to the conduit 63 and the saline liquid being processed through the housing 60. Should any fluid leakage occur, either from the fresh water conduit 63 radially outwardly or saline water radially inwardly between adjacent cells 50, the annular leakage collection grooves 45 will transmit such leakage fluid through the plurality of axial ports 46 along the axially extending leakage passageways to the annular leakage collection chamber 81. A leaking condition is therefore readily detected, and should the degree of leakage be excessive, the assembly of stacked cells 50 can be checked for replacement of defective O-ring seals.

The housing 60, its end closure member 62, the internal end plates 66, 67 and the fresh water conduit 63 may be made of any suitable material, such as metal or fiber-reinforced plastics exhibiting resistance to the corrosion effects of any liquid to be processed through the desalination device. Each of the composite segmental support plates 10 of the cells 50 are preferably constructed of a relatively inexpensive plastic material possessing resistance to corrosion. By construction the radial flow channels 12 in the composite segmental support plates 10 in the manner described so as to locate respective portions of these radial flow channels 12 in each of the disc segments A and B, it is possible to obtain a balanced pressure condition on both sides of the composite segmental plate 10. This feature substantially reduces or eliminates bending stresses in the support plate 10 and enables thin plates of relatively large diameter to be employed in desalination devices. Thus, it is possible to reduce the axial thickness of a desalination cell employing a composite segmental support plate of the character disclosed herein, thereby increasing the number of individual desalination cells 50 per unit length of the desalination device to improve the efficiency thereof.

It will be understood that the foregoing description and drawings are illustrative of a preferred embodiment of this invention, but that various changes in the size, shape, and form of the elements may be resorted to within the spirit of the invention, the scope of the invention being determined by the claims.

We claim:

1. A structural member for use in facilitating the handling of fluids, said member comprising a pair of circular disc segments secured together to define a composite disc-like circular plate, said plate having opposite annular side surfaces respectively provided with a plurality of laterally extending slots arranged across a substantial portion of the respective side surface areas of said plate, each of said disc segments having an outer annular surface so as to serve as the opposite annular side surfaces of said plate in which said plurality of slots are respectively provided, each of said disc segments further having an inner surface provided with a pluraltiy of circumferentially spaced radial grooves communicating with respective slots and extending into the inner periphery of said disc segment, said radial grooves in one disc segment being in opposed relation to corresponding radial grooves in the other disc segment and cooperating therewith to define a plurality of circumferentially spaced wholly internal radial channels hidden within said plate inwardly of the oppposite annular side surfaces of said plate and extending into the inner periphery of said plate, said internal radial channels intersecting with the inner ends of the laterally extending slots provided in each of said opposite annular side surfaces of said plate, said plate being further provided with a plurality of apertures extending therethrough and individually disposed between adjacent internal radial channels and radially inwardly of said plurality of slots in said opposite annular side surfaces of said plate, said plate having a plurality of radial spokes alternating with said plurality of apertures and through which respective internal radial channels extend, respective portions of said radial spokes being provided by said pair of disc segments, the portions of said radial spokes provided by one of said disc segments and the outer peripheral rim of said one disc segment being raised so as to form radially inner and outer axial projections on said one disc segment, the radially inner axial projection including a plurality of bosses arranged in circumferentially spaced relationship, each of said bosses being integral with a corresponding portion of a radial spoke and being positioned at the radially outer end thereof, each of said bosses extending beyond either side of the radial spoke portion corresponding thereto so as to form arms partially bordering the radially outer margins of adjacent apertures, the proximal arms of adjacent bosses being spaced apart, and the radially outer axial projection on said one disc segment formed by said raised outer peripheral rim being provided with a plurality of circumferentially spaced radial notches extending thereacross.

2. A structural member as defined in claim 1, wherein each of said opposite annular side surfaces of said plate has an annular flat central surface portion in which the respective pluralities of laterally extending slots are provided, and said annular flat central surface portions of said plate being axially inset from the remaining portions of said opposite annular side surfaces of said plate.

3. A structural member as defined in claim 2, wherein each of said opposite annular side surfaces of said plate includes radially inner and outer annular flat ledges respectively adjoining the radially inner and outer margins of the corresponding one of said annular flat central surface portions and being of increased axial extent with respect thereto but of lesser axial extent than the remaining portions of said opposite annular side surfaces of said plate.

4. A cell for desalinating liquids by reverse osmosis comprising: a pair of circular disc segments secured together to define a composite disc-like circular plate, said plate having opposite annular side surfaces respectively provided with a plurality of laterally extending slots arranged across a substantial portion of the respective side surface areas of said plate, each of said disc segments having an outer annular surface so as to serve as the opposite annular side surfaces of said plate in which said plurality of slots are respectively provided, each of said disc segments further having an inner surface provided with a plurality of circumferentially spaced radial grooves communicating with respective slots and extending into the inner periphery of said disc segment, said radial grooves in one disc segment being in opposed relation to corresponding radial grooves in the other disc segment and cooperating therewith to define a plurality of circumferentially spaced wholly internal radial channels hidden within said plate inwardly of the opposite annular side surfaces of said plate and extending into the inner periphery of said plate, said internal radial channels intersecting with the inner ends of the laterally extending slots provided in each of said opposite annular side surfaces of said plate, said plate being further provided with a plurality of apertures extending therethrough and individually disposed between adjacent internal radial channels and radially inwardly of said plurality of slots in said opposite annular side surfaces of said plate, said plate having a plurality of radial spokes alternating with said plurality of apertures and through which respective internal radial channels extend, respective portions of said radial spokes being provided by said pair of disc segments, the portions of said radial spokes provided by one of said disc segments and the outer peripheral rim of said one disc segment being raised so as to form radially inner and outer axial projections on said one disc segment, the radially inner axial projection including a plurality of bosses arranged in circumferentially spaced relationship, each of said bosses being integral with a corresponding portion of a radial spoke and being positioned at the radially outer end thereof, each of said bosses extending beyond either side of the radial spoke portion corresponding thereto so as to form arms partially bordering the radially outer margins of adjacent apertures, the proximal arms of adjacent bosses being spaced apart, the radially outer axial projection on said one disc segment formed by said raised outer peripheral rim being provided with a plurality of circumferentially spaced radial notches extending thereacross, each of said opposite annular side surfaces of said plate having an annular flat central surface portion in which the respective pluralities of laterally extending slots are provided, a pair of reverse osmosis membranes respectively secured to the opposite annular side surfaces of said plate, and said pair of reverse osmosis membranes being respectively disposed in overlying relation to each of said annular flat central surface portions of the opposite annular side surfaces of said plate so as to cover said plurality of laterally extending slots in each of said annular flat central surface portions 5. A cell for desalinating liquids as defined in claim 4, wherein each of said opposite annular side surfaces of said plate further includes radially inner and outer annular flat ledges respectively adjoining the radially inner and outer margins of the corresponding one of said annular flat central surface portions and being of increased axial extent with respect thereto but of lesser axial extent than the remaining portions of said opposite annular side surfaces of said plate, said pair of reverse osmosis membranes being respectively seated on said ledges provided on the opposite annular side surfaces of said plate, a pair of filter paper layers, each of said filter paper layers being respectively interposed between a reverse osmosis membrane and said annular flat central surface portion on the respective opposite annular side surfaces of said plate and cooperating with said membrane to form a reverse osmosis membrane assembly on each of said opposite annular side surfaces of said plate.

6. A device for desalinating liquid by reverse osmosis comprising: a housing, a plurality of desalination cells disposed in said housing in stacked relationship; each of said cells comprising: a pair of circular disc segments secured together to define a composite disc-like circular plate, said plate having opposite annular side surfaces, each of the annular side surfaces of said plate having an annular central surface portion respectively provided with a plurality of laterally extending slots arranged thereacross, each of said disc segments having an outer annular surface so as to serve as the opposite annular side surfaces of said plate in which said plurality of slots are respectively provided, each of said disc segments further having an inner surface provided with a plurality of circumferentially spaced radial grooves communicating with respective slots and extending into the inner periphery of said disc segment, said radial grooves in one disc segment being in opposed relation to corresponding radial grooves in the other disc segment and cooperating therewith to define a plurality of circumferentially spaced wholly internal radial channels hidden within said plate inwardly of the opposite annular side surfaces of said plate and extending into the inner periphery of said plate, said internal radial channels intersecting with the inner ends of the laterally extending slots provided in each of said opposite annular side surfaces of said plate, said plate being further provided with a plurality of apertures extending therethrough and individually disposed betwen adjacent internal radial channels and radially inwardly of said plurality of said slots in said opposite annular side surfaces of said plate, said plate having a plurality of radial spokes alternating with said plurality of apertures and through which respective internal radial channels extend, a pair of reverse osmosis membranes respectively secured to the opposite annular side surfaces of said plate and disposed radially outwardly of said plurality of apertures extending therethrough, and said pair of reverse osmosis membranes being respectively disposed in overlying relation to each of said annular central surface portions of the opposite annular side surfaces of said plate so as to cover said plurality of slots in each of said annular central surface portions; inlet means for admitting liquid to be desalinated into said housing and directing the liquid against the plurality of stacked desalination cells, means spacing the proximal membranes of adjacent cells axially apart and cooperating therewith to define an annular space extending between the proximal membranes of respective adjacent cells, said plurality of cells being provided with respective fluid passages between adjacent cells communicatively connecting said inlet means with the annular spaces between the proximal membranes of respective adjacent cells, first outlet means in said housing communicating with said inner periphery of each of said composite disc-like circular plates into which said internal radial channels in each respective plate extend and providing an outlet through which desalinated liquid may be removed from said housing, second outlet means in said housing for discharging non-desalinated liquid concentrate from said housing, and said plurality of apertures in respective plates of said plurality of cells being aligned and cooperating to define a plurality of axially extending passageways which are communicatively connected to said second outlet means.

7. A device for desalinating liquid as defined in claim 6, wherein the radial spokes of each of said plates are provided by respective radial spoke portions of said pair of disc segments, the portions of said radial spokes provided by one of said disc segments and the outer peripheral rim of said one disc segment being raised so as to form radially inner and outer axial projections on said one disc segment which comprise said means spacing the proximal membranes of adjacent cells axially apart, the radially inner axial projection of said one disc segment of each plate including a plurality of bosses arranged in circumferentially spaced relationship, each of said bosses being integral with a corresponding portion of a radial spoke and being positioned at the radially outer end thereof, each of said bosses extending beyond either side of the radial spoke portion corresponding thereto so as to form arms partially bordering the radially outer margins of adjacent apertures, the proximal arms of adjacent bosses being spaced apart thereby defining respective fluid passages from the annular spaces extending between the proximal membranes of adjacent cells to the plurality of axially extending passageways defined by the aligned apertures in said plates, and the radially outer axial projection of said one disc segment of each plate formed by said raised outer peripheral rim being provided with a plurality of circumferentially spaced radial notches extending thereacross, and said notches defining the respective fluid passages between adjacent cells communicatively connecting said inlet means with the annular spaces between the proximal membranes of adjacent cells.

References Cited

UNITED STATES PATENTS

| 2,395,225 | 2/1946 | Kurz | 210—486 |
| 3,083,834 | 4/1963 | Pall | 210—343 X |
| 3,133,132 | 5/1964 | Loeb et al. | 210—23 X |

REUBEN FRIEDMAN, *Primary Examiner.*

F. SPEAR, *Assistant Examiner.*